(12) United States Patent
Wang et al.

(10) Patent No.: US 12,063,565 B2
(45) Date of Patent: Aug. 13, 2024

(54) MULTI-ACCESS EDGE COMPUTING (MEC) SYSTEM, MEC DEVICE, USER EQUIPMENT AND USER PLANE FUNCTION (UPF) SWITCH METHOD

(71) Applicant: Industrial Technology Research Institute, Hsinchu (TW)

(72) Inventors: Wei-Cheng Wang, Hsinchu (TW); Kuo-Wei Wen, Taoyuan (TW); Tsun-Chieh Chiang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 275 days.

(21) Appl. No.: 17/834,373

(22) Filed: Jun. 7, 2022

(65) Prior Publication Data
US 2023/0276329 A1    Aug. 31, 2023

(30) Foreign Application Priority Data

Feb. 25, 2022    (TW) .................................. 111106974

(51) Int. Cl.
*H04W 36/16*    (2009.01)
*H04B 7/185*    (2006.01)
(Continued)

(52) U.S. Cl.
CPC ........ *H04W 36/16* (2013.01); *H04B 7/18513* (2013.01); *H04B 7/18532* (2013.01);
(Continued)

(58) Field of Classification Search
CPC . H04W 36/16; H04W 36/0022; H04W 36/24; H04W 12/06; H04W 40/36;
(Continued)

(56) References Cited

U.S. PATENT DOCUMENTS 10,631,218 B2    4/2020    Baek et al.
10,820,185 B2    10/2020    Faccin et al.
(Continued)

FOREIGN PATENT DOCUMENTS

CN    110290561 A    9/2019
CN    107113662 B    8/2020
(Continued)

OTHER PUBLICATIONS

Frei, Matthias, et al. "An evaluation of the communication performance of MEC-dependent services in 5G networks." 2021 IEEE 20th International Symposium on Network Computing and Applications (NCA). IEEE, 2021. (Year: 2021).*
(Continued)

*Primary Examiner* — Sharad Rampuria
(74) *Attorney, Agent, or Firm* — Birch, Stewart, Kolasch & Birch, LLP

(57) ABSTRACT

A Multi-Access Edge Computing (MEC) system is provided. The MEC system includes a user equipment (UE), an MEC device, and a core network. The MEC device includes a relay User Plane Function (UPF) module, a first UPF module, and a second UPF module. The core network performs a UPF path management corresponding to the UE based on a notification of the MEC device. When the UE attaches to a network, the MEC device establishes an idle session between the UE and the relay UPF module. When the MEC device determines that a service for the UE needs to be switched from the first UPF module to the second UPF module and the second UPF module has not been activated, the MEC device notifies the core network to switch the service for the UE from the first UPF module to the relay UPF module first.

17 Claims, 6 Drawing Sheets

(51) Int. Cl.
*H04L 67/141* (2022.01)
*H04W 36/00* (2009.01)
*H04W 36/24* (2009.01)

(52) U.S. Cl.
CPC ....... *H04B 7/18541* (2013.01); *H04L 67/141* (2013.01); *H04W 36/0022* (2013.01); *H04W 36/24* (2013.01)

(58) Field of Classification Search
CPC ... H04W 84/047; H04W 88/16; H04W 36/12; H04B 7/18513; H04B 7/18532; H04B 7/18541; H04L 67/141
See application file for complete search history.

(56) References Cited

U.S. PATENT DOCUMENTS

| | | | | |
|---|---|---|---|---|
| 11,653,281 | B2* | 5/2023 | Yang | H04W 36/00837 370/331 |
| 11,751,043 | B2* | 9/2023 | Lee | H04W 76/10 370/329 |
| 11,800,576 | B2* | 10/2023 | Youn | H04W 76/32 |
| 2019/0007500 | A1 | 1/2019 | Kim et al. | |
| 2019/0268815 | A1 | 8/2019 | Zhu et al. | |
| 2019/0274185 | A1 | 9/2019 | Stojanovski et al. | |
| 2020/0053828 | A1 | 2/2020 | Bharatia et al. | |
| 2020/0274942 | A1 | 8/2020 | Mueck et al. | |

FOREIGN PATENT DOCUMENTS

| | | |
|---|---|---|
| CN | 112134643 A | 12/2020 |
| CN | 112714413 A | 4/2021 |
| JP | 2019-525500 A | 9/2019 |
| TW | 202019207 A | 5/2020 |
| TW | I718713 B | 2/2021 |
| WO | WO 2021/189269 A1 | 9/2021 |

OTHER PUBLICATIONS

Abdah et al., "Handover Prediction Integrated with Service Migration in 5G Systems," IEEE International Conference on Communications (ICC), 2020, total 7 pages.

Arunachalam et al., "A Session-Based Cross-Layer Approach for Seamless Connectivity in Next-Generation Mobile Networks," IEEE Access, Nov. 27, 2020, vol. 8, pp. 216398-216408 (total 11 pages).

Bojović et al., "IP Session continuity in heterogeneous mobile networks using Software Defined Networking," IEEE Journal of Communications and Networks, Nov. 13, 2017, pp. 1-6.

Bukhari et al., "QoS based approach for LTE-WiFi handover," IEEE 2016 7th International Conference on Computer Science and Information Technology (CSIT), 2016, total 6 pages.

Stöhr et al., "Multi RAT (WiFi/LTE/5G) Mobile Network featuring RoF Fronthaul, 60 GHz Beam-Switching and Mobile IP," IEEE European Conference on Optical Communication (ECOC), 2018, total 3 pages.

Subburayalu et al., "Dynamic Load Balancing across Multi-radio Access Bearers in 5G," IEEE 2019 11th International Conference on Communication Systems & Networks (COMSNETS), 2019, pp. 306-311.

Taiwanese Notice of Allowance for Taiwanese Application No. 111106974, dated Sep. 14, 2022.

Japanese Office Action dated Sep. 26, 2023 for Application No. 2022-111206 with an English translation.

* cited by examiner

MULTI-ACCESS EDGE COMPUTING (MEC) SYSTEM, MEC DEVICE, USER EQUIPMENT AND USER PLANE FUNCTION (UPF) SWITCH METHOD

CROSS REFERENCE TO RELATED APPLICATIONS

This Application claims priority of Taiwan Patent Application No. 111106974 filed on Feb. 25, 2022, the entirety of which is incorporated by reference herein.

BACKGROUND

Field of the Disclosure

The disclosure generally relates to User Plane Function (UPF) technology, and more particularly, to a UPF switch technology in which a relay UPF is used to avoid service interruptions to the user equipment (UE) when the UPF switch occurs.

Description of the Related Art

As the use of mobile devices becomes more widespread and as network service applications (e.g. video streams, virtual reality, autonomous vehicles, and so on) have progressed, the requirements on data traffic have increased. Therefore, Multi-Access Edge Computing (MEC) is used in 5G communication for the increasing data traffic requirements and computations. The MEC is used to provide cloud computation capability and an Information Technology (IT) environment to the edge of the mobile network. Its main purpose is to reduce the computation performed by the core network apparatus and assist operators in establishing a specific mobile experience platform for the customers.

However, in the structure of 5G MEC, when the User Plane Function (UPF) needs to be switched (e.g. a handover is taking place on the user equipment (UE)), the service of the UE may be interrupted because of the UPF switch. As a result, the user experience will suffer.

BRIEF SUMMARY

A Low Earth Orbit (LEO) satellite system and a handover method for the LEO satellites are provided.

An embodiment of the disclosure provides a Multi-Access Edge Computing (MEC) system. The MEC system includes user equipment (UE), an MEC device, and a core network. The MEC device includes a relay User Plane Function (UPF) module, a first UPF module, and a second UPF module. The core network performs a UPF path management corresponding to the UE based on a notification of the MEC device. When the UE attaches to a network, the MEC device establishes an idle session between the UE and the relay UPF module. When the MEC device determines that a service for the UE needs to be switched from the first UPF module to the second UPF module and the second UPF module has not been activated, the MEC device notifies the core network to switch the service for the UE from the first UPF module to the relay UPF module first.

An embodiment of the disclosure provides a Multi-Access Edge Computing (MEC) device. The MEC device includes a relay User Plane Function (UPF) module and an Application Function (AF) module. The AF module establishes an idle session between the user equipment (UE) and the relay UPF module when the UE attaches to a network. In addition, the AF module determines whether a service for the UE needs to be switched from a first UPF module to a second UPF module. When the AF module determines that the service for the UE needs to be switched from the first UPF module to the second UPF module and the second UPF module has not been activated, the AF module notifies a core network to switch the service for the UE from the first UPF module to the relay UPF module first.

An embodiment of the disclosure provides user equipment (UE). The UE includes a receiving device and a processing device. When a Multi-Access Edge Computing (MEC) device determines that a service for the UE needs to be switched from a first User Plane Function (UPF) module to the second UPF module and the second UPF module has not been activated, the receiving device receives a first indication from a core network, and based on the first indication, the processing device switches to a relay UPF module to perform the service.

An embodiment of the disclosure provides a User Plane Function (UPF) switch method. The UPF switch method is applied to a Multi-Access Edge Computing (MEC) system. The UPF switch method includes the following steps. When user equipment (UE) of the MEC system attaches to a network, an MEC device of the MEC system establishes an idle session between the UE and a relay UPF module. When the MEC device determines that a service for the UE needs to be switched from a first UPF module to a second UPF module, and the second UPF module has not been activated, the MEC device notifies the core network of the MEC system to switch the service for the UE from the first UPF module to the relay UPF first.

Other aspects and features of the disclosure will become apparent to those with ordinary skill in the art upon review of the following descriptions of specific embodiments of MEC system, MEC device, UE and UPF switch method.

BRIEF DESCRIPTION OF THE DRAWINGS

The disclosure will become more fully understood by referring to the following detailed description with reference to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
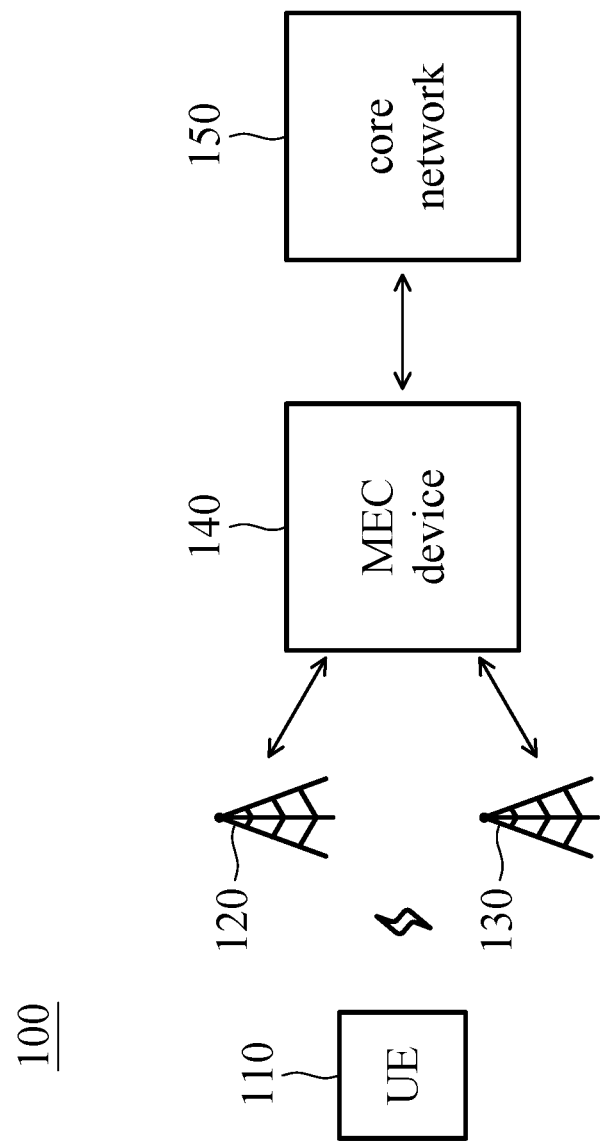
FIG. 1 is a block diagram of a Multi-Access Edge Computing (MEC) system 100 according to an embodiment of the disclosure.

FIG. 1 is a block diagram of a Multi-Access Edge Computing (MEC) system 100 according to an embodiment of the disclosure. As shown in FIG. 1, the MEC system 100 may comprise user equipment (UE) 110, a first access network 120, a second access network 130, an MEC device 140 and a core network 150. It should be noted that FIG. 1 presents a simplified block diagram in which only the elements relevant to the disclosure are shown. However, the disclosure should not be limited to what is shown in FIG. 1.

According to an embodiment of the disclosure, the UE 110 may be a smart phone, personal data assistant (PDA), a paging device, a note book, a desktop computer, a wireless portable device or any computing device with wireless communication interface.

According to an embodiment of the disclosure, the first access network 120 may be a non-3GPP access network, e.g. a Wi-Fi access point (AP), but the disclosure should not be limited thereto. In addition, according to an embodiment of the disclosure, the second access network 130 may be a 3GPP access network, e.g. base station (e.g. gNB), but the disclosure should not be limited thereto.

Figure 2:
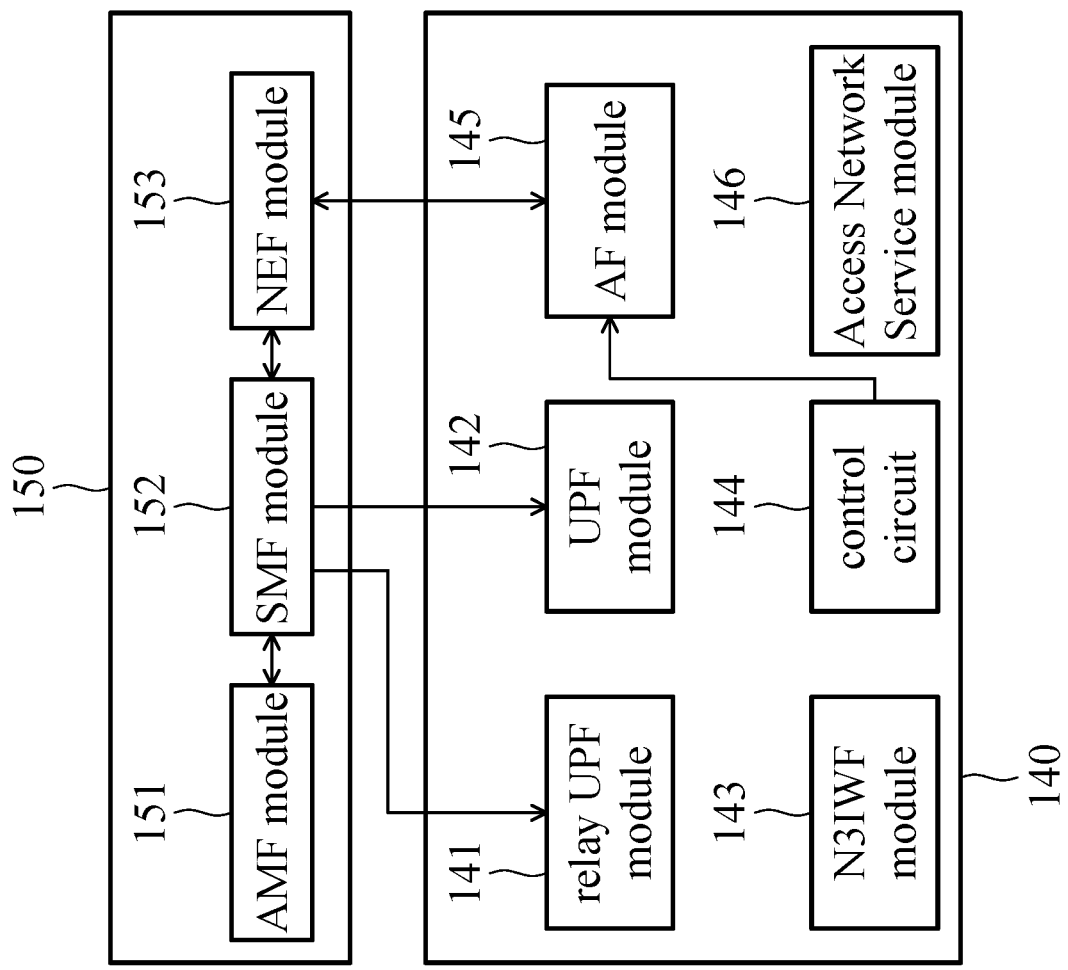
FIG. 2 is a block diagram of the MEC device 140 and the core network 150 according to an embodiment of the disclosure.

FIG. 2 is a block diagram of the MEC device 140 and the core network 150 according to an embodiment of the disclosure. As shown in FIG. 2, the MEC device may comprise a relay User Plane Function (UPF) module 141, a UPF module 142, a non-3GPP Inter-Working Function (N3IWF) module 143, a control circuit 144, an Application Function (AF) module 145 and an Access Network Service module 146. It should be noted that FIG. 2 presents a simplified block diagram in which only the elements relevant to the disclosure are shown. However, the disclosure should not be limited to what is shown in FIG. 2. The MEC device 140 also can comprise other elements and function modules. In addition, there is only one UPF module 142 in FIG. 2, but the disclosure should not be limited thereto. The MEC device 140 also can establish a plurality of UPF modules. Each UPF module may serve one or more UE. Furthermore, the "UPF" in the disclosure can be regarded as an intermediate UPF (I-UPF).

In addition, as shown in FIG. 2, the core network 150 may comprise an Access and Mobility Function (AMF) module 151, a Session Management Function (SMF) module 152 and a Network Exposure Function (NEF) module 153. It should be noted that FIG. 2 presents a simplified block diagram in Which only the elements relevant to the disclosure are shown. However, the disclosure should not be limited to what is shown in FIG. 2. The core network 150 also can comprise other elements and function modules. According to the embodiments of the disclosure, the AMF module 151 may manage the register and authentication operations of the UE 110. The SMF module 152 may manage the sessions of the UE 110 and control the configurations and establishments of the UPF modules. The SMF module 152 may communicate with relay UPF module 141 and the UPF module 142 through a N4 interface. The NEF module 153 may communicate with the AF module 145 through a N33 interface.

According to an embodiment of the disclosure, when the UE 110 attaches to the network through the first access network 120 or the second access network 130, the AF module 145 may notify the NEF module 153 to establish an idle session between the UE 110 and the relay UPF module 141.

In addition, when the UE 110 attaches to the network through the first access network 120 or the second access network 130, the UE 110 may use the UPF module 142 to perform data transmission with the network end and obtain the service (the application corresponding to the Access Network Service module 146) from the network end. According to an embodiment of the disclosure, when the UE 110 communicates with the core network 150 through a 3GPP access network (e.g. the second access network 130), the core network 150 can directly communicate with the UE 110 through the UPF module 142. According to another embodiment of the disclosure, when the UE 110 communicates with the core network 150 through a non-3GPP access network (e.g. the first access network 120), the UE 110 needs to communicate with the core network 150 through the N3IWF module 143. It should be noted that there is only one UPF module 142 in FIG. 2, but the disclosure should not be limited thereto. The first access network 120 or the second access network 130 may respectively correspond to different UPF modules.

According to an embodiment of the disclosure, the control circuit 144 may determine whether a trigger condition is generated. According to an embodiment of the disclosure, the trigger condition may comprise whether a handover needs to be performed on UE 110, whether to update the UPF, whether to allocate the UPF resource, and whether a slicing policy is triggered, but the disclosure should not be limited thereto.

According to an embodiment of the disclosure, when the control circuit 144 determines that a trigger condition is generated (e.g. handover needs to be performed on UE 110), the control circuit 144 may notify the AF module 145 that the trigger condition is generated. After the AF module 145 receives the notification, according to the notification, the AF module 145 may determine whether the service for the UE 110 needs to be switched from the UPF module 142 to a new UPF module.

When the AF module 145 determines that the service for the UE 110 needs to be switched from the UPF module 142 to a new UPF module, the AF module 145 may determine whether the new UPF is activated (or the new UPF module has existed). According to an embodiment of the disclosure, if the new UPF has been activated, the AF module 145 may send notification to the NEF module 153 of the core network 150 to indicate the core network 150 to switch the service for the UE 110 from the UPF module 142 to the new UPF module.

According to an embodiment of the disclosure, if the new UPF has not been activated, the AF module 145 may send notification to the NEF module 153 of the core network 150 to indicate the SMF module 152 of the core network 150 to switch the service for the UE 110 from the UPF module 142 to the relay UPF module 141 first, and the AF module 145 may continuously monitor whether the new UPF is activated. When the SMF module 152 of the core network 150 has established the new UPF module in the MEC device 140, the AF module 145 may send notification to the NEF module 153 of the core network 150 to indicate the SMF module 152 to switch the service for the UE 110 from the relay UPF module 141 to the new UPF module.

According to an embodiment of the disclosure, if the new UPF module corresponds to a non-3GPP access network (e.g. the first access network 120), the AF module 145 may send a notification to the NEF module 153 to indicate the SMF module 152 to perform authentication and encryption through the N3IWF module 143 to the UE 110 and the new UPF before switching the service for the UE 110 from the UPF module 142 to the new UPF module.

In addition, according to an embodiment of the disclosure, if the new UPF module corresponds to a non-3GPP access network (e.g. the first access network 120), before the AF module 145 may send a notification to the NEF module 153 to indicate the SMF module 152 to switch the service for the UE 110 from the UPF module 142 to the new UPF module, the AF module 145 may determine whether the UE 110 has detached from the N3IWF module 143 first. When the UE 110 has detached from the N3IWF module 143, the AF module 145 may send a notification to the NEF module 153 to indicate the SMF module 152 to switch the service for the UE 110 from the UPF module 142 to the new UPF module.

According to an embodiment of the disclosure, when the service for the UE 110 from a first UPF module 142 to a second UPF module and the second UPF module has not been activated, the receiving device (not shown in figures) of the UE 110 may receive a first indication from the core network 150, and the processing device (not shown in figures) of the UE 110 may switch the service for the UE 110 to a relay UPF module first based on the first indication. After the second UPF module has been activated, the receiving device of the UE 110 may receive a second indication from the core network 150, the processing device of the UE 110 may switch the service for the UE 110 to the second UPF module first based on the second indication.

Figure 3:
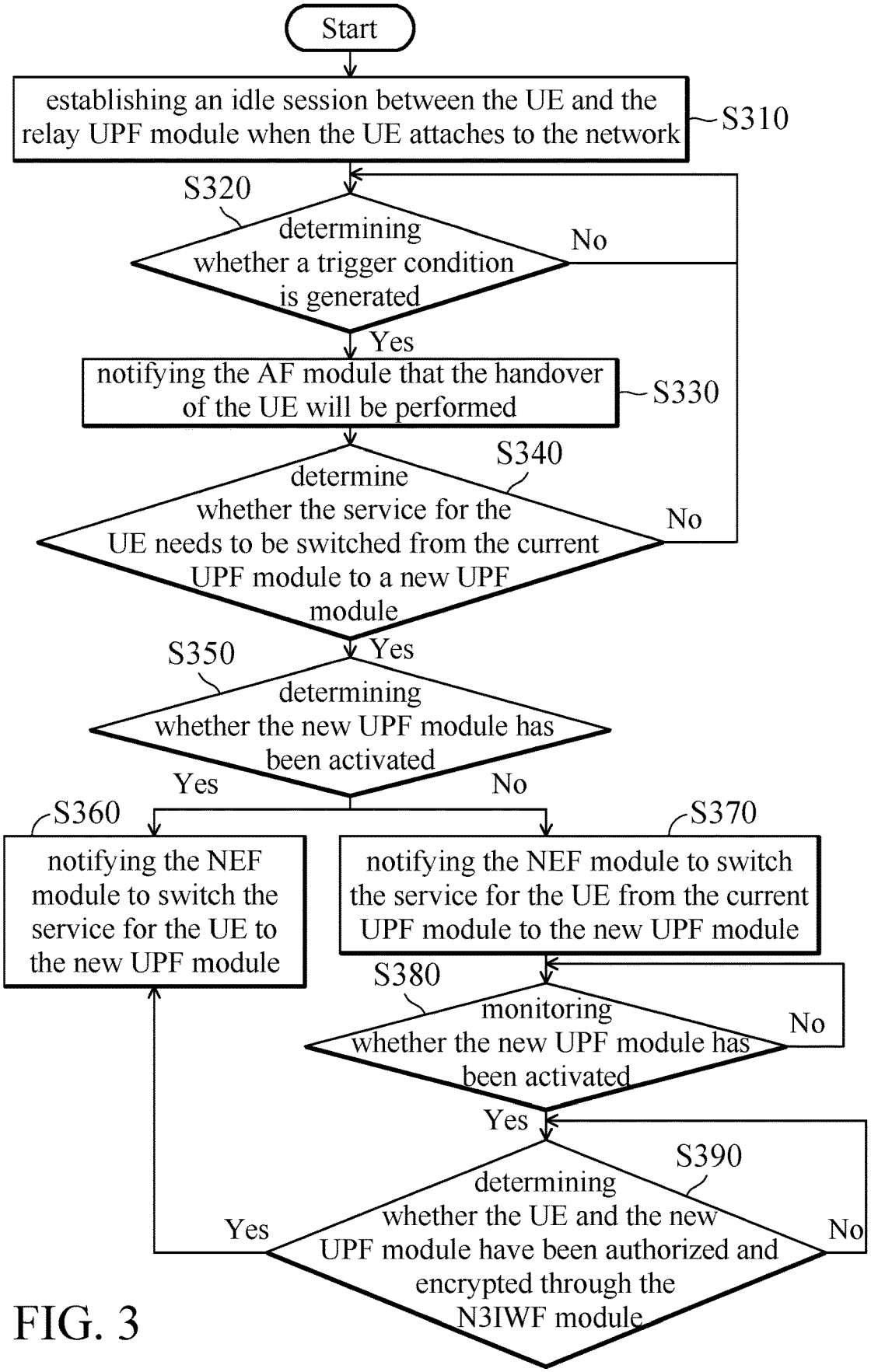
FIG. 3 is a flow chart illustrating a UPF switch method according to an embodiment of the disclosure.

FIG. 3 is a flow chart illustrating a UPF switch method according to an embodiment of the disclosure. The UPF switch method can be applied to the MEC system 100. In addition, the embodiment is based on the condition of the UE 110 handing over from the second access network 130 to the first access network 120 (i.e. hand over form the 3GPP access network to the non-3GPP access network). In step S310, when the UE 110 attaches to the network, the AF module 145 may notify the NEF module 153 to establish an idle session between the UE 100 and the relay UPF module 141. In step S320, the control circuit 144 may determine whether a trigger condition is generated. If the trigger condition is not generated, the control circuit 144 may perform step S320 continuously.

When the control circuit 144 determines that the UE 110 needs to hand over from the second access network 131) to the first access network 120 (i.e. the trigger condition is generated), step S330 is performed. In step S330, the control circuit 144 may notify the AF module 145 that the handover of the UE 110 will be performed. In step S340, the AF module 145 may determine whether the service for the UE 110 needs to be switched from the current UPF module (i.e. UPF module 142) to a new UPF module (not shown in figures). If the service for the UE 110 does not need to be switched from the UPF module 142 to a new UPF module, the method backs to step S320. If the service for the UE 110 needs to be switched from the UPF module 142 to a new UPF module, step S350 is performed. In step S350, the AF module 145 may determine whether the new UPF module has been activated (or determine whether the new UPF exists).

If the new UPF module has been activated, step S360 is performed. In step S360, the AF module 145 may notify the NEF module 153 of the core network 150 to switch the service for the UE 110 from the UPF module 142 to the new UPF module. If the new UPF module has not been activated, step S370 is performed. In step S370, the AF module 145 may notify the NEF module 153 of the core network 150 to switch the service for the UE 110 from the UPF module 142 to the relay UPF module 141 first. In step S380, the AF module 145 may monitor (or determine) whether the new UPF module has been activated continuously. If the new UPF module has not been activated, the AF module 145 may perform step S380 continuously.

When the SMF module 152 of the core network 150 has established the new UPF module in the MEC device 140, step S390 is performed. In step S390, the AF module 145 may determine whether the UE 110 and the new UPF module have been authorized and encrypted through the N3IWF module 143. Specifically, in step S390, the SMF module 152 may determine whether the UE 110 and the new UPF module have been authorized and encrypted through the N3IWF module 143 first and then transmit the determination result to the NEF module 153. Then, the NEF module 153 may transmit the determination result generated by the SWF module 152 to the AF module 145. Accordingly, the AF module 145 will be able to determine whether the UE 110 and the new UPF module have been authorized and encrypted through the N3IWF module 143. If the UE 110 and the new UPF module have not been authorized and encrypted through the N3IWF module 143, the AF module 145 may perform step S390 continuously. When the UE 110 and the new UPF module have been authorized and encrypted through the N3IWF module 143, step S360 is performed. The AF module 145 may notify the NEF module 153 of the core network 150 to switch the service for the UE 110 to the new UPF module.

Figure 4:
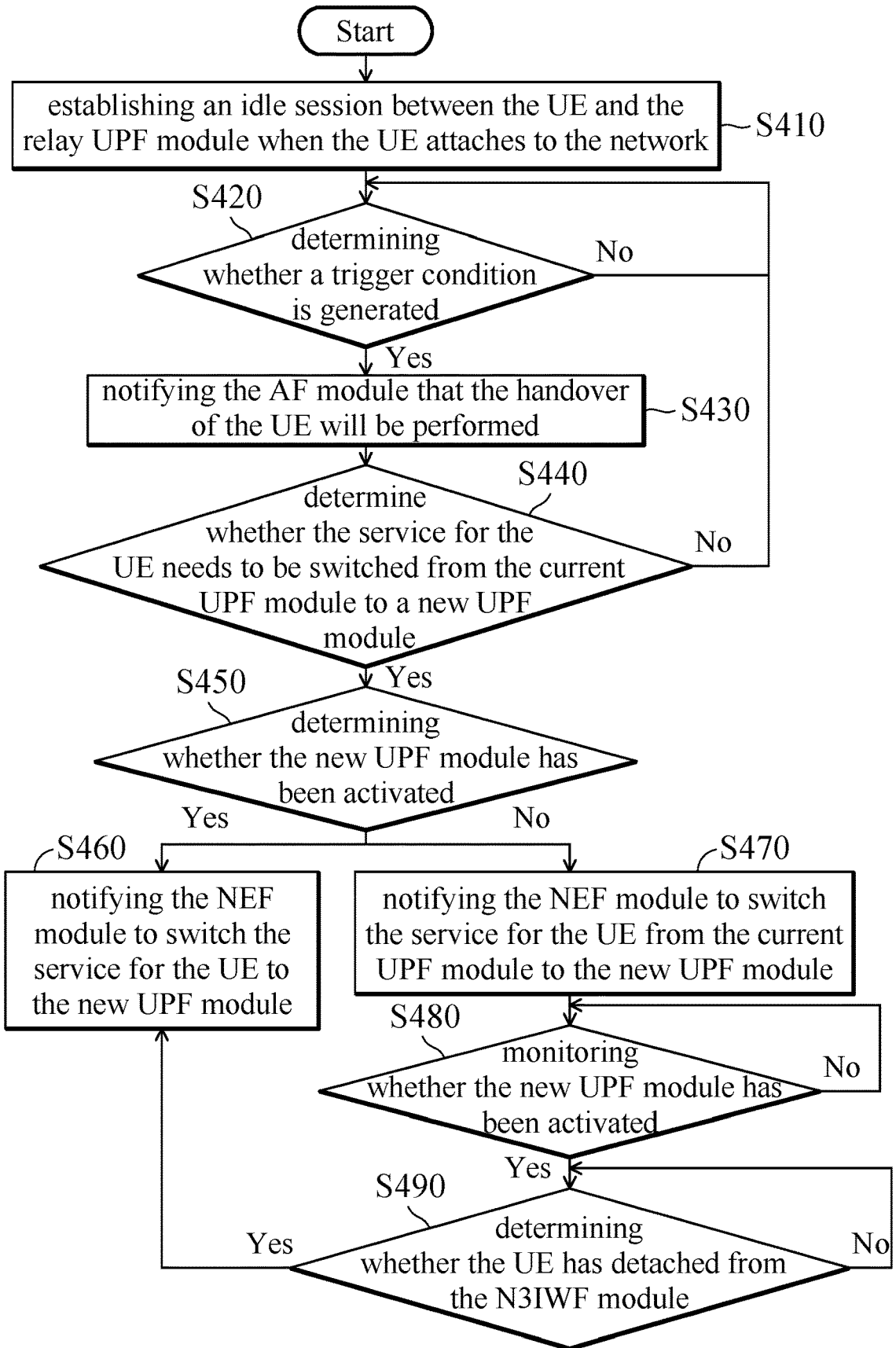
FIG. 4 is a flow chart illustrating a UPF switch method according to another embodiment of the disclosure.

It should be noted that in the condition of the condition of the UE 110 handing over from the second access network 130 to another 3GPP access network (i.e. hand over form the 3GPP access network to another 3GPP access network), step S390 does not need to be performed. That is to say, in this condition, when the SMF module 152 of the core network 150 has established the new UPF module in the MEC device 140, the AF module 145 may directly notify the NEF module 153 of the core network 150 to switch the service for the UE 110 to the new UPF module FIG. 4 is a flow chart illustrating a UPF switch method according to another embodiment of the disclosure. The UPF switch method can be applied to the MEC system 100. In addition, the embodiment is based on the condition of the UE 110 handing over from the first access network 120 to the second access network 130 (i.e. hand over form the non-3GPP access network to the 3GPP access network). In step S410, when the UE 110 attaches to the network, the AF module 145 may notify the NEF module 153 to establish an idle session between the UE 100 and the relay UPF module 141. In step S420, the control circuit 144 may determine whether a trigger condition is generated. If the trigger condition is not generated, the control circuit 144 may perform step S420 continuously.

When the control circuit 144 determines that the UE 110 needs to hand over from the first access network 120 to the second access network 130 (i.e. the trigger condition is generated), step S430 is performed. In step S430, the control circuit 144 may notify the AF module 145 that the handover of the UE 110 will be performed. In step S440, the AF module 145 may determine whether the service for the UE 110 needs to be switched from the UPF module 142 to a new UPF module (not shown in figures). If the service for the UE 110 does not need to be switched from the UPF module 142 to a new UPF module, the method backs to step S420. If the service for the UE 110 needs to be switched from the UPF module 142 to a new UPF module, step S350 is performed. In step S450, the AF module 145 may determine whether the new UPF module has been activated (or determine whether the new UPF exists).

If the new UPF module has been activated, step S460 is performed. In step S460, the AF module 145 may notify the NEF module 153 of the core network 150 to switch the service for the UE 110 from the UPF module 142 to the new UPF module. If the new UPF module has not been activated, step S470 is performed. In step S470, the AF module 145 may notify the NEF module 153 of the core network 150 to switch the service for the UE 110 from the UPF module 142 to the relay UPF module 141 first. In step S480, the AF module 145 may monitor whether the new UPF module has been activated continuously. If the new UPF module has not been activated, the AF module 145 may perform step S480 continuously.

When the SW module 152 of the core network 150 has established the new UPF module in the MEC device 140, step S490 is performed. In step S490, the AF module 145 may determine whether the UE 110 has detached from the N3IWF module 143, Specifically, in step S490, the SMF module 152 may determine whether the UE 110 has detached from the N3IWF module 143 first and then transmit the determination result to the NEF module 153. Then, the NEF module 153 may transmit the determination result generated by the SMF module 152 to the AF module 145. Accordingly, the AF module 145 will be able to determine whether the UE 110 has detached from the N3IWF module 143. If the UE 110 has not detached from the N3IWF module 143, the AF module 145 may perform step S490 continuously. If the UE 110 has detached from the N3IWF module 143, step S460 is performed. The AF module 145 may notify the NEF module 153 of the core network 150 to switch the service for the UE 110 to the new UPF module.

It should be noted that in the condition of the UE 110 handing over from the first access network 120 to another non-3GPP access network 130 (i.e. hand over form the non-3GPP access network to another non-3GPP access network), step S390 needs to be performed between step S480 and step S490. That is to say, after the SMF module 152 of the core network 150 has established the new UPF module in the MEC device 140, the AF module 145 may determine whether the UE 110 and the new UPF module have been authorized and encrypted through the N3IWF module 143 first. Specifically, the SMF module 152 may determine whether the UE 110 and the new UPF module have been authorized and encrypted through the N3IWF module 143 first and then transmit the determination result to the NEF module 153. Then, the NEF module 153 may transmit the determination result generated by the SMF module 152 to the AF module 145. Accordingly, the AF module 145 will be able to determine whether the UE 110 and the new UPF module have been authorized and encrypted through the N3IWF module 143. Until the UE 110 and the new UPF module have been authorized and encrypted through the N3IWF module 143, step S490 is not performed.

Figure 5:
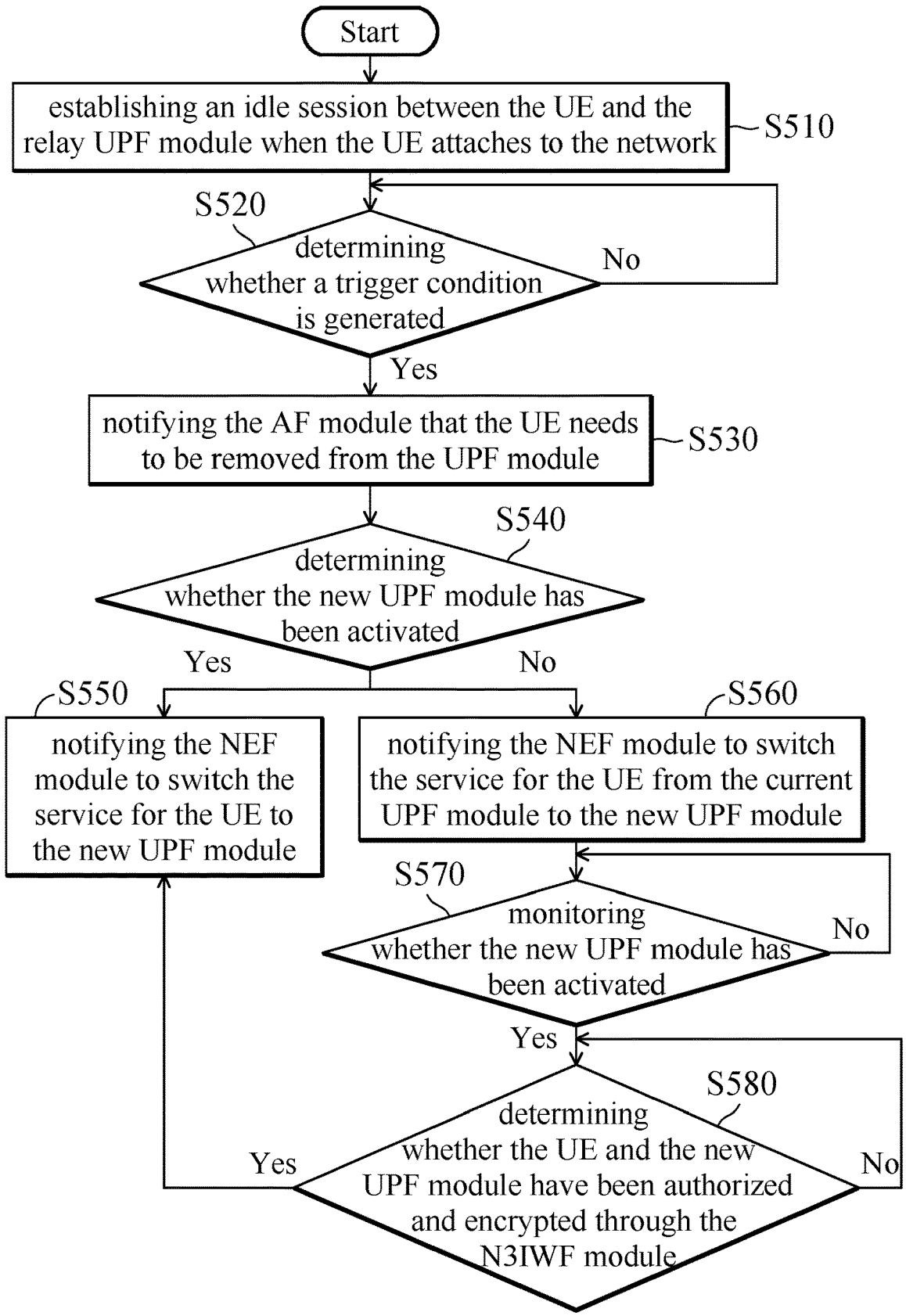
FIG. 5 is a flow chart illustrating a UPF switch method according to another embodiment of the disclosure.

FIG. 5 is a flow chart illustrating a UPF switch method according to another embodiment of the disclosure. The UPF switch method can be applied to the MEC system 100. In addition, the embodiment is based on the condition of the UE 110 having a low priority. In step S510, when the UE 110 attaches to the network, the AF module 145 may notify the NEF module 153 to establish an idle session between the UE 100 and the relay UPF module 141. In step S520, the control circuit 144 may determine whether a trigger condition is generated. If the trigger condition is not generated, the control circuit 144 may perform step S520 continuously.

When the control circuit 144 determines that the resource of the UPF module 142 corresponding to the slice of the UE (not shown in figures) with high priority (i.e. the trigger condition is generated) is not enough, step S530 is performed. In step S530, the control circuit 144 may notify the AF module 145 that the UE 110 with low priority needs to be removed from the current UPF module (i.e. UPF module 142). In step S540, the AF module 145 may determine whether a new UPF module has been activated (or determine whether a new UPF exists).

If the new UPF module has been activated, step S550 is performed. In step S550, the AF module 145 may notify the NEF module 153 of the core network 150 to switch the service for the UE 110 from the UPF module 142 to the new UPF module. If the new UPF module has not been activated, step S560 is performed. In step S560, the AF module 145 may notify the NEF module 153 of the core network 150 to switch the service for the UE 110 from the UPF module 142 to the relay UPF module 141 first. In step S570, the AF module 145 may monitor whether the new UPF module has been activated continuously. If the new UPF module has not been activated, the AF module 145 may perform step S570 continuously.

When the SMF module 152 of the core network 150 has established the new UPF module in the MEC device 140, step S580 is performed. In step S580, the AF module 145 may determine whether the UE 110 and the new UPF module have been authorized and encrypted through the N3IWF module 143. Specifically, in step S580, the SMF module 152 may determine whether the UE 110 and the new UPF module have been authorized and encrypted through the N3IWF module 143 first and then transmit the determination result to the NEF module 153. Then, the NEF module 153 may transmit the determination result generated by the SWF module 152 to the AF module 145. Accordingly, the AF module 145 will be able to determine whether the UE 110 and the new UPF module have been authorized and encrypted through the N3IWF module 143. If the UE 110 and the new UPF module have not been authorized and encrypted through the N3IWF module 143, the AF module 145 may perform step S580 continuously. When the UE 110 and the new UPF module have been authorized and encrypted through the N3IWF module 143, step S550 is performed. The AF module 145 may notify the NEF module 153 of the core network 150 to switch the service for the UE 110 to the new UPF module.

The steps of the UPF switch method associated with updating UPF or allocating resources are similar to the steps illustrated in FIG. 5. Therefore, details will not repeat again.

Figure 6:
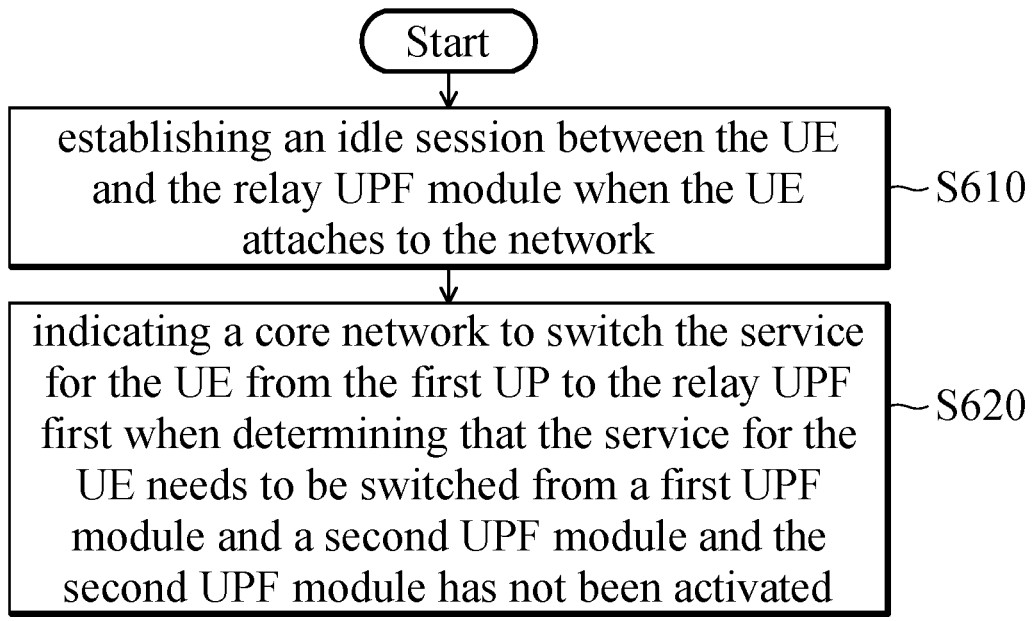
FIG. 6 is a flow chart illustrating a UPF switch method according to an embodiment of the disclosure.

FIG. 6 is a flow chart illustrating a UPF switch method according to an embodiment of the disclosure. The UPF switch method can be applied to the MEC system 100. As shown in FIG. 6, in step S610, when a UE of the MEC system 100 attaches to a network, an MEC device of the MEC system 100 may establish an idle session between the UE and a relay UPF module.

In step S620, when the MEC device of the MEC system 100 determines that the service for the UE needs to be switched from a first UPF module and a second UPF module, and the second UPF module has not been activated, the MEC device of the MEC system 100 indicate a core network of the MEC system 100 to switch the service for the UE from the first UP to the relay UPF first.

In the UPF switch method, the MEC device of the MEC system 100 may determine whether the second UPF has been activated. When the MEC device of the MEC system 100 determines that the second UPF has been activated, the MEC device may indicate the core network of the MEC system 100 to switch the service for the UE from the first UPF module to the second UPF module.

According to the UPF switch methods provided in the disclosure, when the service for the UE needs to be switched from a UPF module to another UPF module, the MEC device can determine whether to switch the service for the UE to a relay UPF module first. Therefore, in the UPF switch methods provided in the disclosure, the interruption of the service for the UE can be avoided when the service for the UE needs to be switched from a UPF module to another UPF module.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects, Obviously, the teaching of the disclosure can be accomplished by many methods, and any specific configurations or functions in the disclosed embodiments only present a representative condition. Those who are skilled in this technology will understand that all of the disclosed aspects in the disclosure can be applied independently or be incorporated.

While the disclosure has been described by way of example and in terms of preferred embodiment, it should be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A Multi-Access Edge Computing (MEC) system, comprising:
   a user equipment (UE);
   an MEC device, comprising a relay User Plane Function (UPF) module, a first UPF module, and a second UPF module; and a core network, performing a UPF path management corresponding to the UE based on a notification from the MEC device,
   wherein when the UE attaches to a network, the MEC device establishes an idle session between the UE and the relay UPF module;
   wherein when the MEC device determines that a service for the UE needs to be switched from the first UPF module to the second UPF module and the second UPF module has not been activated,
   the MEC device notifies the core network to switch the service for the UE from the first UPF module to the relay UPF module first;
   wherein the MEC device determines whether a trigger condition is generated,
   wherein when the trigger condition is generated,
   the MEC device determines whether the service for the UE needs to be switched from the first UPF module to the second UPF module, and
   if the service for the UE needs to be switched from the first UPF module to the second UPF module, the MEC device determines whether the second UPF module has been activated;
   wherein when the MEC device determines that the second UPF module has not been activated, the MEC device waits for the core network to activate the second UPF module, and
   when the second UPF module has been activated, the MEC device notifies the core network to switch the service for the UE from the relay UPF module to the second UPF module.

2. The MEC system of claim 1, wherein when the MEC device determines that the second UPF module has been activated, the MEC device notifies the core network to switch the service for the UE from the first UPF module to the second UPF module.

3. The MEC system of claim 1, wherein before the MEC device notifies the core network to switch the service for the UE from the relay UPF module to the second UPF module, the MEC device authorizes the UE through a non-3GPP Inter-Working Function (N3IWF) module.

4. The MEC system of claim 1, wherein an Application Function (AF) module of the MEC device notifies a Network Exposure Function (NEF) of the core network through a communication interface to perform the UPF path management corresponding to the UE.

5. The MEC system of claim 4, wherein the communication interface is an N33 interface.

6. A Multi-Access Edge Computing (MEC) device, comprising:
   a relay User Plane Function (UPF) module; and an Application Function (AF) module,
   establishing an idle session between a user equipment (UE) and the relay UPF module when the UE attaches to a network, and
   determining whether a service for the UE needs to be switched from a first UPF module to a second UPF module,
   wherein when the AF module determines that the service for the UE needs to be switched from the first UPF module to the second UPF module and the second UPF module has not been activated,
   the AF module notifies a core network to switch the service for the UE from the first UPF module to the relay UPF module first;
   a control circuit, determining whether a trigger condition is generated, wherein when the trigger condition is generated,
   the AF module determines whether the service for the UE needs to be switched from the first UPF module to the second UPF module, and
   if the AF module determines that the service for the UE needs to be switched from the first UPF module to the second UPF module, the AF module determines whether the second UPF module has been activated;
   wherein when the AF module determines that the second UPF module has not been activated, the AF module waits for the core network to activate the second UPF module, and
   when the second UPF module has been activated, the AF module notifies the core network to switch the service for the UE from the relay UPF module to the second UPF module.

7. The MEC device of claim 6, wherein when the AF module determines that the second UPF module has been activated, the AF module notifies the core network to switch the service for the UE from the first UPF module to the second UPF module.

8. The MEC device of claim 6, further comprising: a non-3GPP Inter-Working Function (N3IWF) module, wherein before the AF module notifies the core network to switch the service for the UE from the relay UPF module to the second UPF module, the AF module indicates the N3IWF module to authorize the UE.

9. The MEC device of claim 6, wherein the AF module notifies a Network Exposure Function (NEF) of the core network through a communication interface to perform the UPF path management corresponding to the UE.

10. The MEC device of claim 9, wherein the communication interface is an N33 interface.

11. A user equipment (UE), comprising:
   a receiving device; and
   a processing device, wherein when a Multi-Access Edge Computing (MEC) device determines that a service for the UE needs to be switched from a first User Plane Function (UPF) module to the second UPF module and the second UPF module has not been activated, the receiving device receives a first indication from a core network, and
   based on the first indication, the processing device switches to a relay UPF module to perform the service;
   wherein the MEC device determines whether a trigger condition is generated,
   wherein when the trigger condition is generated, the MEC device determines whether the service for the UE needs to be switched from the first UPF module to the second UPF module, and
   if the service for the UE needs to be switched from the first UPF module to the second UPF module, the MEC device determines whether the second UPF module has been activated;
   wherein when the MEC device determines that the second UPF module has not been activated, the MEC device waits for the core network to activate the second UPF module, and
   when the second UPF module has been activated, the MEC device notifies the core network to switch the service for the UE from the relay UPF module to the second UPF module.

12. The UE of claim 11, wherein when the second UPF module has been activated, the receiving device receives a second indication from the core network, and based on the second indication, the processing device switches to the second UPF module to perform the service.

13. A User Plane Function (UPF) switch method, applied in a Multi-Access Edge Computing (MEC) system, comprising:
   when a user equipment (UE) of the MEC system attaches to a network, an MEC device of the MEC system establishes an idle session between the UE and a relay UPF module; and
   when the MEC device determines that a service for the UE needs to be switched from a first UPF module to a second UPF module and the second UPF module has not been activated,
   the MEC device notifies a core network of the MEC system to switch the service for the UE from the first UPF module to the relay UPF first;
   determining, by the MEC device, whether a trigger condition is generated;
   when the trigger condition is generated, determining, by the MEC device, whether the service for the UE needs to be switched from the first UPF module to the second UPF module; and
   if the service for the UE needs to be switched from the first UPF module to the second UPF module,
   determining by the MEC device, whether the second UPF module has been activated;
   when the MEC device determines that the second UPF module has not been activated, waiting for, by the MEC device, the core network to activate the second UPF module; and
   when the second UPF module has been activated, notifying, by the MEC device,
   the core network to switch the service for the UE from the relay UPF module to the second UPF module.

14. The UPF switch method of claim 13, further comprising: when the MEC device determines that the second UPF module has been activated, notifying, by the MEC device, the core network to switch the service for the UE from the first UPF module to the second UPF module.

15. The UPF switch method of claim 13, further comprising: before the MEC device notifies the core network to switch the service for the UE from the relay UPF module to the second UPF module, authorizing, by the MEC device, the UE through a non-3GPP Inter-Working Function (N3IWF) module.

16. The UPF switch method of claim 13, further comprising:
   notifying, by an Application Ruction (AF) module of the MEC device, a Network Exposure Function (NEF) of the core network through a communication interlace to perform the UPF path management corresponding to the UE.

17. The UPF switch method of claim 16, wherein the communication interface is an N33 interface.

* * * * *